Aug. 14, 1962 G. K. WALTERS 3,049,686
ACTIVE CIRCUIT ELEMENT
Filed Dec. 31, 1958
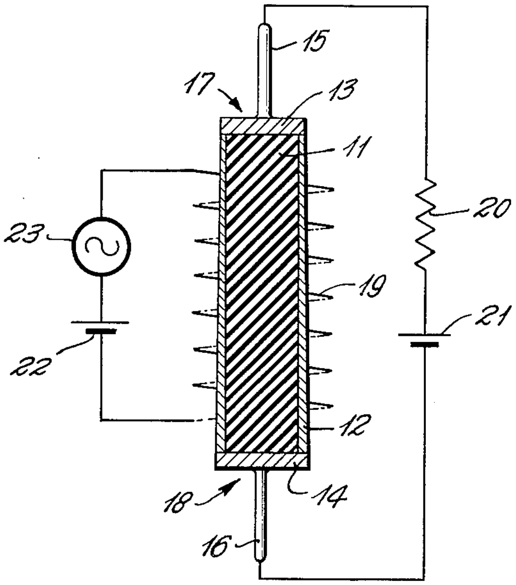
INVENTOR
Geoffrey K. Walters
BY Stevens, Davis, Miller & Mosher
ATTORNEYS United States Patent Office 3,049,686

Patented Aug. 14, 1962

3,049,686
ACTIVE CIRCUIT ELEMENT

Geoffrey K. Walters, Dallas, Tex., assignor to Texas Instruments Incorporated, Dallas, Tex., a corporation of Delaware Filed Dec. 31, 1958, Ser. No. 784,128
6 Claims. (Cl. 338—32)

This invention relates to a new and improved active circuit element which can be used instead of the vacuum tube or the transistor. The circuit element makes use of the phenomenon of superconductivity.

The two most well known active circuit elements of the prior art are the vacuum tube and the transistor. The present invention comprises a circuit element which is totally different from these two circuit elements and yet performs functionally the same as these circuit elements of the prior art.

The circuit element of the present invention comprises a cylindrical body made of insulatng material. On this body is a coating which is maintained at a temperature at which the coating is superconducting. The thickness of the coating gradually increases from one end of the cylindrical body to the other. An electrical winding is positioned around the coated cylindrical body.

In operation the circuit element is connected so that current will flow through the coating from one end of the body to the other. When current is passed through the winding the resulting magnetic field will tend to destroy the superconductivity of the coating. The superconductivity will be destroyed starting at the end where the coating is thickest and proceed towards the other end as the magnetic field is increased. Thus, the conduction through the element will vary as a function of the magnetic field produced by the winding. By the correct choice of gradient in the varying thickness of the coating, a small change in the magnetic field can be made to cause a large change in the conduction through the coating and thus the element can be used in the same manner as a vacuum tube or a transistor. The circuit element of the present invention improves over the vacuum tube and the transistor in that it will operate equally well with current flowing in either direction through the element. The device operates in a manner similar to vacuum tubes in that it is primarily a voltage amplifying device and the current flowing through the superconducting film must be of a low magnitude. The current through the film must not produce a magnetic field strength great enough to adversely affect the superconductivity of the superconducting film.

It is, therefore, one object of the present invention to provide a signal translating device which makes use of the properties of material which become superconductive at low temperatures in its operation.

It is another object of the present invention to provide a signal translating device capable of satisfactory operation irrespective of the polarity of bias and signal currents flowing in the device.

Other objects and advantages of the invention will become readily apparent as the following description of the preferred embodiment unfolds and when taken in conjunction with the single FIGURE of the drawings which shows a cross sectional view of the circuit element and illustrates how the circuit element may be connected in a circuit.

As shown in the figure, the circuit element comprises a cylindrical base or body 11, which is made of insulating material such as a ceramic. A thin coating or film 12 covers the sides of the cylindrical body 11 and thus forms a tubular shell. This coating is made of a material which becomes superconducting if it is brought to a low enough temperature. Examples of such material are niobium, vanadium, tin, lead alloys and tantalum. At each end of the cylindrical body 11 are contacts 13 and 14 which make electrical contact with the coating 12. Conductors 15 and 16 are electrically connected to the contacts 13 and 14, respectively. The contacts 13 and 14, together with the conductors 15 and 16, comprise a means for passing electric current through the film 12. The film 12 is shaped so that its thickness gradually increases from one end 17 of the element to the other end 18 of the element. Positioned axially around the coated cylindrical body is a winding 19.

Means are provided (not shown in the figure) to maintain the coating 12 at temperatures below which the coating becomes superconductive. This means, for example, may be a container of liquid helium in which the coated cylinder is immersed. The winding 19 preferably will also be immersed in the helium but may be positioned around the outside of the container. When the coating is thus maintained at this low temperature, it will become superconducting.

When a current is passed through the winding 19 it will produce a magnetic field which will be applied to the coated cylindrical body. This magnetic field will tend to destroy the superconductivity of the film 12. Whether or not the magnetic field destroys the superconductivity of the film depends upon the thickness of the film and the strength of the magnetic field. Relatively weak magnetic fields will destroy superconductivity of only the thicker part of the coating. The thickness of the film which will be destroyed by a magnetic field is an inverse function of the strength of the magnetic field. Thus, a relatively weak magnetic field produced by winding 19 will destroy the superconductivity of the film 12 at the end 18 where the film is the thickest and with stronger magnetic fields the superconductivity of more of the film 12 will be destroyed. The distance from the end 18 at which the superconductivity of the film 12 is destroyed then varies as a direct function of the magnetic field which, in turn, is directly related to the current flowing through the winding 19. Thus the conductance through the film 12 will be a monotonically varying function of the current flowing through the winding 19.

The thickness of the film throughout the entire length of the body is designed to be less than the penetration depth in the film 12 during normal operation of the circuit element. The term "penetration depth," generally speaking, is the depth a superconductor is penetrated by a magnetic field or the depth into the surface of a superconductor through which current will flow. The penetration depth is not a fixed quantity and a full explanation of the penetration depth will be found in chapter V, pages 138 through 178 of the text Superconductivity, second edition, by D. Shoenberg, published by the Cambridge University Press in 1952. This text is hereby incorporated by reference.

This circuit element will function similar to a vacuum tube or a transistor in their linear ranges. The figure shows how the element may be connected as an amplifier. Current is passed through the film 12 from one end to the other by connecting the conductors 15 and 16 in circuit with the series circuit of a load resistor 20 and a battery 21. A battery 22 is applied across the winding 19 to cause a bias current to flow therethrough. This bias current is selected so that the magnetic field produced thereby destroys the superconductivity of only a part of the coating contiguous to end 18. A signal input 23 is applied in series with the battery 22 and the winding 19 to cause the current through the winding 19 to vary in accordance with the input signal. Thus, the distance from the end 17 to the point at which the superconductivity is destroyed will vary in accordance with the input signal. Thus, the conduction through the film 12 will vary in accordance with the input signal and hence, the voltage across the load resistor 20 will vary in accordance with the input signal. This voltage across the load resistor 20 is the output voltage.

By selecting the thickness gradient of the film 12 to be small enough, the amplification factor of the output signal over the input signal can be made very high. By choice of the thickness gradient the amplification factor may be selected over a wide range. The output signal may be a linear amplification of the input signal or it may be designed to be any monotonically varying non-linear function of the input signal simply by selecting the manner in which the thickness of the film 12 increases from the end 17 to the end 18.

The winding 19 performs the function of a means to apply a variable magnetic field to the coating 12 and other means to perform this function may be used instead.

Many other modifications may be made to the disclosed embodiment without departing from the spirit and scope of the invention which is limited only as defined in the appended claims.

What is claimed is:

1. A circuit element comprising a body of insulating material, a coating on said body, said coating comprising a material which becomes superconducting below a given temperature, the thickness of said coating increasing from one end of said body to the other end of said body, and an electrical winding positioned around the coating on said body.

2. A circuit element comprising a shell of material which becomes superconducting below a given temperature, said shell having a thickness which increases from one end of said shell to the other end of said shell, means for causing an electric current to flow from one end of the shell to said other end of said shell, and means for applying a variable magnetic field through said shell, thereby to vary the amount of superconductivity in said shell when said shell is below said given temperature.

3. A circuit element comprising a sheet of a material which becomes superconducting below a given temperature, said sheet having a thickness which varies from one end of said sheet to the other end of said sheet, means for causing an electric current to flow from said one end of said sheet to said other end of said sheet, and means for applying a variable magnetic field to said sheet, thereby to vary the amount of superconductivity in said shell when said shell is below said given temperature.

4. A circuit element comprising a body of material which becomes super-conducting below a given temperature, said body having a thickness which varies from one end of said body to the other end of said body, means to pass current through said body from said one end to said other end, and means to apply a variable magnetic field to said body.

5. A circuit element comprising a body of material which becomes super-conducting below a given temperature, said body having a thickness which varies from one end of said body to the other end of said body, means to pass current through said body from said one end to said other end, and an electrical winding positioned around said body.

6. A circuit element comprising a body of insulating material, a coating of a material on said body which becomes super-conducting below a given temperature, said coating having a thickness on said body that increases from one end of said body to the other end of said body, and means for applying a variable magnetic field to said coating, whereby the passage of a current through said coating and the application of a variable magnetic field to said coating when said coating is below said given temperature produces a variation in the amount of superconductivity in said coating.

References Cited in the file of this patent

UNITED STATES PATENTS

| | | |
|---|---|---|
| 1,739,256 | Pender et al. | Dec. 10, 1929 |
| 2,189,122 | Andrews | Feb. 6, 1940 |
| 2,659,868 | Ericsson et al. | Nov. 17, 1953 |

OTHER REFERENCES

Publication: "Future Circuit Aspects of Solid State Phenomena," by E. W. Herold; Proceedings of the I.R.E., vol. 45, No. 11, November 1957, pages 1465–1466.